United States Patent [19]

Quenot

[11] 3,863,346

[45] Feb. 4, 1975

[54] RIGID MEASURING ROD
[75] Inventor: Michel Quenot, Besancon, France
[73] Assignee: Stanley Mabo, Besancon, France
[22] Filed: Dec. 11, 1972
[21] Appl. No.: 314,028

[30] Foreign Application Priority Data
Dec. 9, 1971 France .............................. 71.44151

[52] U.S. Cl. .................. 33/88, 33/342, 33/107 CB
[51] Int. Cl. ............................................ G01c 9/00
[58] Field of Search ..... 33/342, 107 CB, 88, 137 R, 33/107 R, 126.7 R

[56] References Cited
UNITED STATES PATENTS

| | | | |
|---|---|---|---|
| 1,019,453 | 3/1912 | Goodnow........................ | 33/126.7 R |
| 3,321,836 | 5/1967 | Seely, Jr............................ | 33/107 R |
| 3,507,045 | 4/1970 | Rives................................. | 33/107 R |
| 3,522,657 | 8/1970 | Metrulis................................. | 33/88 |

*Primary Examiner*—Samuel B. Rothberg
*Assistant Examiner*—Willis Little
*Attorney, Agent, or Firm*—Robert E. Burns; Emmanuel Lobato; Bruce L. Adams

[57] ABSTRACT

A rigid, linear rod having an integral slideway having opposed, open-ended grooves in which scales are interchangeably inserted longitudinally into the grooves. Tips on the end of the rod hold individual tapes with scales thereon, against longitudinal shifting. The tapes are resilient, and are resiliently secured in the slideway grooves. The tips are removable and replaceable so that different scales can be interchangeably mounted on the rod. The construction allows mass construction since the same type rods can be provided with different scales which are graduated differently.

3 Claims, 3 Drawing Figures

RIGID MEASURING ROD

BACKGROUND OF THE INVENTION

This invention relates generally to linear measuring rods and more particularly to measuring rods having interchangeable graduation scales thereon.

Measuring rods exist which comprise a main slideway manufactured from a light weight alloy. The slideway has a square or rectangular cross section, is solid or hollow, and, in the latter case may be shaped as a "U." One of the faces of these known measuring rods has either an engraved measuring scale placed thereon by a mechanical or chemical process, or a slideway which can house a light weight alloy reglet or scale which may be made of any suitable material. The reglet or scale has measuring graduations engraved by mechanical or chemical process.

It is also possible to build measuring rods with a pressed or molded section and a reinforcing unit through which a measuring tape is drawn. In the latter case, the tape is locked at various positions by a lock nut.

The graduations of various scales on different types of measuring rods, or similar known measuring devices are complicated to form and construct, not only because of high cost, but also since such graduations must be marked either on the rod proper or on a special scale, which can be inserted into the slideway and individually engraved on the measuring devices by either a mechanical or chemical process. Furthermore, the required assembly of existing measuring devices, using measuring tapes, in conjunction therewith is relatively complicated.

SUMMARY OF THE INVENTION

An object of the invention is to provide a strong rigid hollow measuring rod of the type having a level device therein which offers the possibility of using interchangeable scales having different graduations thereon.

Another object is the production of an attractive rigid measuring rod.

The rigid measuring rod, according to the invention, is characterized by the fact that the rod is a hollow, drawn section or member, with the level therein. At least one face of the rod has a slideway formed by two parallel projections with open-ended grooves on the inside of their faces. A longitudinal central or axial ridge is placed between the grooves. A reglet or scale formed as a section of a flexible metal tape is introduced into the slideway by sliding it into these grooves, which are open-ended at the time of such assembly. The scale is resiliently held in the grooves by the ridge. In this manner, it is possible to obtain, at a low cost, a rigid measuring rod with multiple applications.

According to variable demand and the market conditions it is possible to insert into the slideway of the rod a measuring tape, which is flexible and slideable therein, made of steel or any other resilient material. The scale may be a standard, chromed or enamelled, scale and graduated according to the metric system or any other system, with necessary numbering, in one or two colors, and with the tape furnished in desired lengths. The low cost of manufacturing such a rigid measuring rod permits the use of the latter in the make-up of many measuring instruments such as those described hereinafter.

BRIEF DESCRIPTION OF THE DRAWINGS

The invention will be clearly described with the aid of the following description and attached drawings according to which.

DESCRIPTION OF THE PREFERRED EMBODIMENTS

Figure 2:
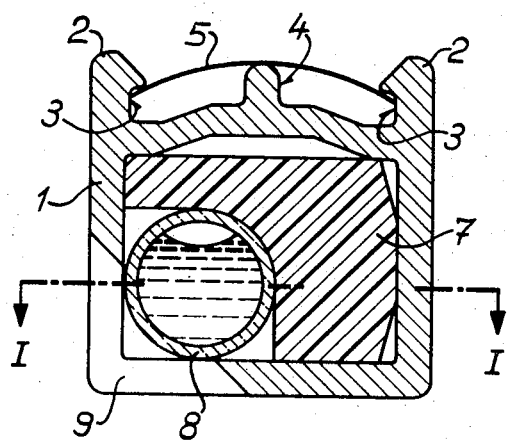
FIG. 2 is a cross section view, taken on section line II—II of FIG. 1.

The figures in the drawing illustrate a rigid measuring rod formed as a hollow, tubular rod 1 with a square cross section made of a light metal or of plastic. This rod 1 has a slideway running its full length, comprising two integral, parallel projections 2 spaced from each other and each one with an open-ended lateral groove 3 on the inner face thereof. A central longitudinal ridge 4 with rounded edges extends axially of the rod. A steel tape 5, arcuate in cross section and of standard design, is inserted longitudinally into the slideway and has a scale or graduations 6. The central or axial, longitudinal ridge 4 permits guiding better the arcuate tape while it slides with its two longitudinal edges in the grooves. The ridge 4 extends beyond the grooves 3 and resiliently holds the tape 5 against the upper surfaces bounding the grooves as shown in FIG. 2. The figure also shows that the three projections 2, 2, 4 reinforce the hollow rod against bending stresses.

Figure 3:
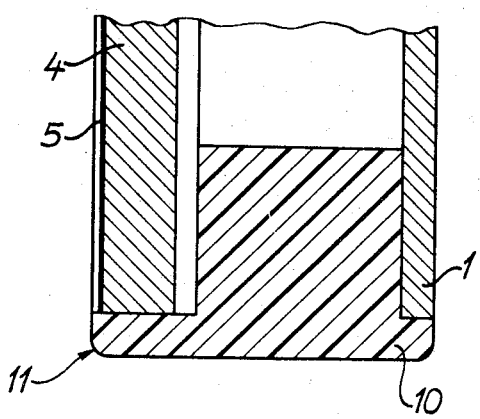
FIG. 3 is a cross section view taken on section line III—III of FIG. 1.
Figure 1:
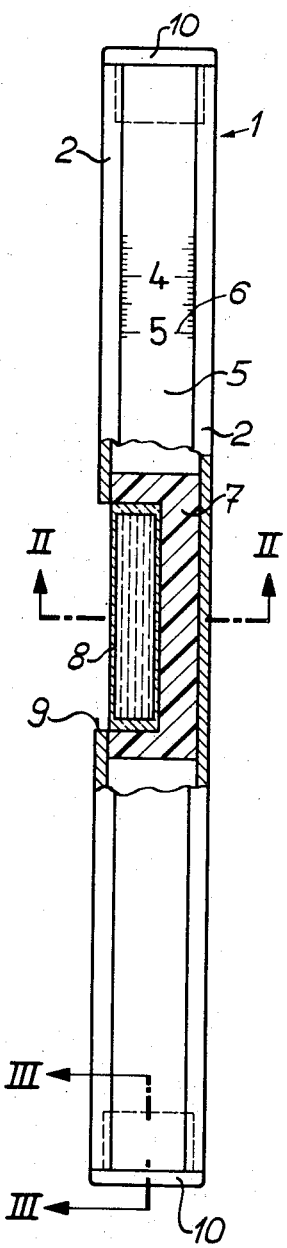
FIG. 1 is a top view of a rigid measuring rod, according to the invention, taken on section line I—I of FIG. 2.

Both extremities of the rod 1 are protected by a respective tip 10 shown in FIG. 1 and 3 and made of plastic or metal, which serves to protect the extremities against bumps and, to avoid the introduction of dirt or foreign bodies into the rod and to removably mount the graduated tape 5 on the rod by a lip 11. These tips hold the scale 5 axially in position on the rod 1.

As shown in FIG. 1, the rigid measuring rod can be used both as a linear measuring device and as a level. To this end, the rod 1 is provided with a notch 9 through which small level bubble 8 can be seen. The latter is mounted in the section's recess or notch by means of a bottle cradle 7 mounted tightly in the tubular rod 1.

The rod 1 is readily manufactured at favorable production costs by drawing it, for example. Rod 1 can be either a closed or open section, with one or more slideways on one or more of its faces without going beyond the bounds of the invention.

The measuring tapes used are standard, flexible measuring tapes, made of metal, tempered steel, manufactured by known methods and in very long rolls. Thus, it is possible to arrive at low production costs with a great variety of scale graduations on different individual scales. Vertical or horizontal numbering 6 can be marked on these measuring tapes.

The assembly of measuring tape 5 and of section or rod 1 is extremely simple and is accomplished by sliding an individual flexible measuring tape into the slideway longitudinally into the open-ended grooves. Then, the tape is locked in by the tips 10 in order to avoid any longitudinal displacement. The lips 11 of the tips 10 at both extremities of the section 1 are abutted by the ends of the tape present in the slideway.

Thus, rigid measuring rods manufactured as disclosed can have a great many uses. For example, in the manufacture of the following measuring devices, on a non restrictive basis:

a diameter gage compass with a fixed folding nose, mounted or not, at one end of the main section 1 over which slides a movable nose, not shown.

a meter with hooks for lumber merchants; each end of the main section 1 is provided with two fixed steel (or any other material) points permitting a series of successive measurements by simple carry-over operation.

a painter's gage. The upper end of the main section 1 is provided with a small plastic wheel (roller), permitting the displacement of the device along and against the ceiling, while a sliding component mounted on the section 1 can be locked by means of a lock nut, and has a pencil point.

a carpenter's gage which is very similar to the painter's gage described above.

a beam compass. One of the extremities of the section 1 is provided with a fixed perpendicular point, forming the center of the circle, while a movable perpendicular component provided with a pencil point or a point slides along the section unto which it can be locked by means of a lock nut, permitting the tracing of a large diameter circle which could not otherwise be traced with a standard dividers compass.

a height measuring apparatus; the section 1 is mounted in such a case on a supporting plate on which the person to be measured has to stand, while a movable sliding square, with a lock device sliding along the section and which will then be placed above the head of the person to be measured.

a cloth merchant's measuring apparatus for a counter, with a section 1 meter to 1 meter 50 long or longer, free or held horizontally by any available means over the counter and permitting the measuring of the cloth by placing the latter against the measuring section.

a rigid measuring rod for the gaging of fuel oil tanks or of any other liquids.

a rigid movable measuring rod with a sliding square and a locking device, permitting to measure, at floor level; jumping bars for pole vaulting stands.

poles for high jumping stands.

a rigid movable measuring rod permitting the measurement of the distance jumped in long jumping.

What we claim and desire to secure by Letters Patent is:

1. A measuring device comprising a rigid, linear, hollow rod; a bubble level mounted inside said hollow rod and in a viewable position; slideway means on said rod for interchangeably mounting at least one measuring tape on said rod for measuring therewith, said slideway comprising three parallel projections on said rod, all extending longitudinally of and reinforcing the rod, two of said projections being spaced apart and having surfaces defining two opposed, open ended, longitudinal grooves, and the third projection extending upwardly and beyond said surfaces; and a metallic, resilient measuring tape slidably received in the slideway and resiliently held in the grooves by said third projection.

2. A device according to claim 1 including means inserted in opposite ends of said hollow rod for longitudinally holding the measuring tape on the rod.

3. A measuring device according to claim 1, in which said scale is arcuate in cross section and has an outwardly convex surface overlying said axial ridge.

* * * * *